(12) United States Patent
Talanki et al.

(10) Patent No.: US 11,797,440 B2
(45) Date of Patent: Oct. 24, 2023

(54) METHOD AND NMP DIMM FOR MANAGING ADDRESS MAP

(71) Applicant: SAMSUNG ELECTRONICS CO., LTD., Suwon-si (KR)

(72) Inventors: Raghu Vamsi Krishna Talanki, Bangalore (IN); Eldho Pathiyakkara Thombra Mathew, Bangalore (IN); Vishnu Charan Thummala, Bangalore (IN); Vinod Kumar Srinivasan, Bangalore (IN); Jin In So, Hwaseong-si (KR); Jong-Geon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/854,772

(22) Filed: Jun. 30, 2022

(65) Prior Publication Data
US 2023/0004489 A1 Jan. 5, 2023

(30) Foreign Application Priority Data
Jun. 30, 2021 (IN) .............................. 202141029449

(51) Int. Cl.
*G06F 12/06* (2006.01)

(52) U.S. Cl.
CPC ...... *G06F 12/063* (2013.01); *G06F 2212/206* (2013.01)

(58) Field of Classification Search
None
See application file for complete search history.

(56) References Cited

U.S. PATENT DOCUMENTS 11,010,057 B2 * 5/2021 Muthiah ............... G06F 3/0656

* cited by examiner

*Primary Examiner* — Charles J Choi
(74) *Attorney, Agent, or Firm* — Sughrue Mion, PLLC

(57) ABSTRACT

A Near Memory Processing (NMP) dual in-line memory module (DIMM) for managing an address map is provided. The NMP DIMM includes: a static random-access memory (SRAM) provided on a Double Data Rate (DDR) interface; and an address management controller coupled to the SRAM, and configured to control the NMP DIMM to: receive a first indication from a host system to perform interface training for operating an SRAM space; perform the interface training using a first address map based on the first indication; receive a second indication from the host system indicating completion of the interface training for operating the SRAM space; switch from the first address map to a second address map for operating the SRAM space in response based on the second indication; and operate the SRAM space using the second address map.

20 Claims, 9 Drawing Sheets

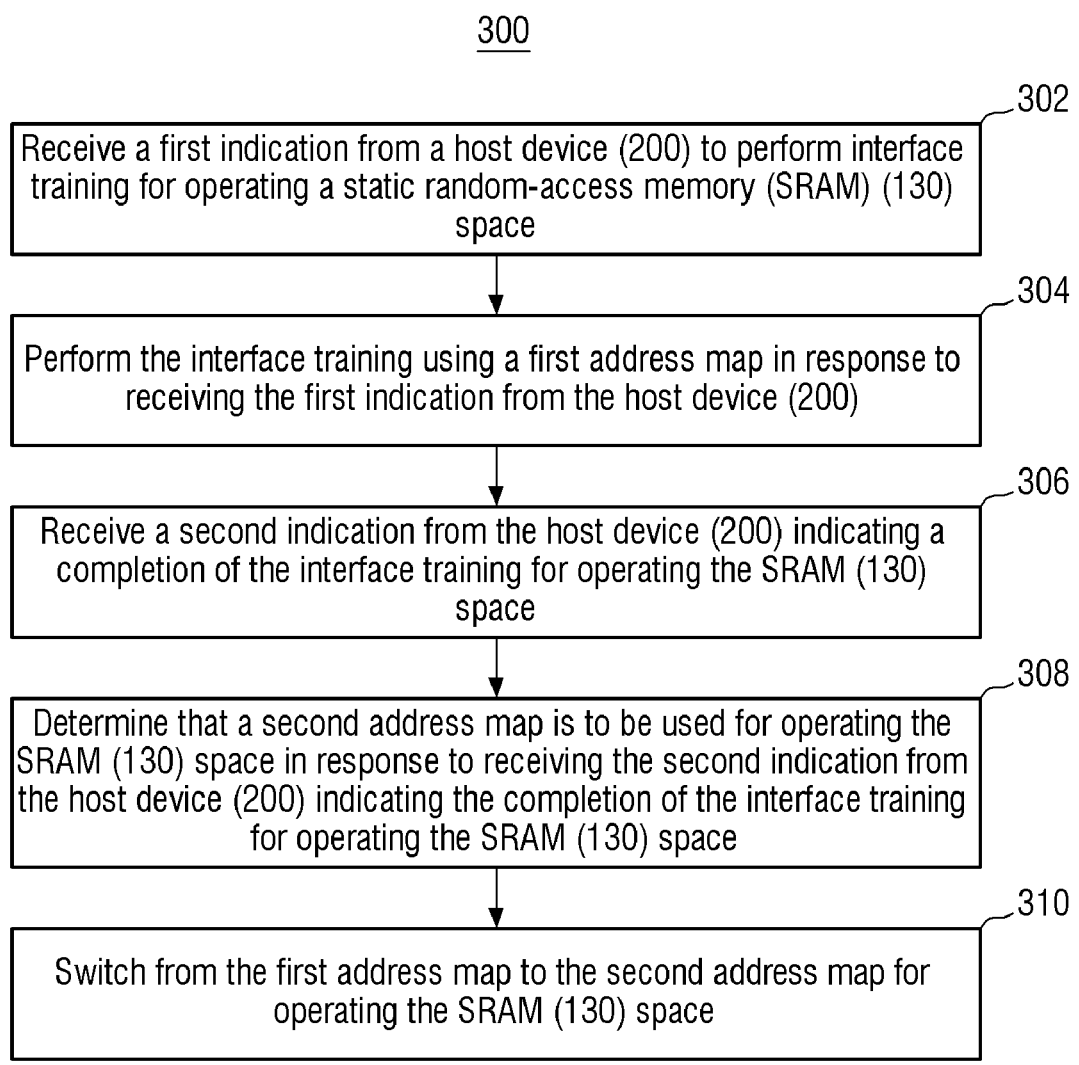

METHOD AND NMP DIMM FOR MANAGING ADDRESS MAP

CROSS-REFERENCE TO THE RELATED APPLICATION

This application claims priority from Indian Patent Application No. 202141029449, filed on Jun. 30, 2021 in the Office of the Controller General of Patents, Designs and Trade Marks (Indian Patent Office), the disclosure of which is incorporated herein by reference in its entirety.

BACKGROUND

1. Field

Methods, apparatuses and systems consistent with example embodiments relate to memory management in electronic devices, and more particularly to method and a Near Memory Processing (NMP) dual in-line memory module (DIMM) for managing an address map of the NMP DIMM.

2. Related Art

An NMP DIMM includes multiple dynamic random access memories (DRAMs) and a static random access memory (SRAM), which acts as an internal memory. A DRAM includes ranks, bank groups, banks, rows and columns which are introduced for pipelining of data. However, a host system treats the SRAM as a DRAM, and therefore accesses the SRAM according to DRAM commands and allocates memory space to be used by an application. In memory allocation, the host system prepares an address map for the NMP DIMM by mapping physical addresses of the host system with corresponding physical address of the DRAM by considering interleaving at rank, bank group, bank, row and column levels. The DRAM is not directly exposed to the host system, and the SRAM acts as the interface between the host system and the NMP DIMM. However, the host system prepares the address map for the NMP DIMM based on the assumption the SRAM (i.e., interface) is a DRAM, and prepares the address map by interleaving at rank, bank group, bank, row and column levels. Because the SRAM is very small relative to the DRAMs, and also does not include the rank, bank group, bank, the row and the column which are present in the DRAM, the address map created by the host system includes a large number of vacant spaces. As a result of the large number of vacant spaces in the address map of the NMP DIMM, the memory at the NMP DIMM is non-contiguous, which drastically slows the performance of the NMP DIMM.

Thus, there is a need to address the above mentioned disadvantages or other shortcomings or at least provide a useful alternative.

SUMMARY

One or more example embodiments provide a method and a NMP DIMM for managing an address map in the NMP DIMM by switching from a first address map to a second address map for operating a static random-access memory (SRAM) space. The first address map is used during interface training for operating the SRAM address space and the second address map is used for a normal mode of operating the SRAM address space which includes read and write operations. One or more example embodiments eliminate the need for a look-up table for the address map by providing continuous memory. As a result, one or more example embodiments address the problem of performance degradation caused by non-contiguous address map by providing contiguous memory at the NMP DIMM.

According to an example embodiment, a method for managing an address map in a NMP DIMM is provided. The method includes: receiving, by the NMP DIMM, a first indication from a host system to perform interface training for operating an SRAM space; performing, by the NMP DIMM, the interface training using a first address map based on the first indication; receiving, by the NMP DIMM, a second indication from the host system indicating completion of the interface training for operating the SRAM space; switching, by the NMP DIMM, from the first address map to a second address map for operating the SRAM space based on the second indication; and operating, by the NMP DIMM, the SRAM space using the second address map.

According to an example embodiment, a NMP DIMM for managing an address map is provided. The NMP DIMM includes: an SRAM provided on a DDR interface; and an address management controller coupled to the SRAM, and configured to control the NMP DIMM to: receive a first indication from a host system to perform interface training for operating an SRAM space; perform the interface training using a first address map based on the first indication; receive a second indication from the host system indicating completion of the interface training for operating the SRAM space; switch from the first address map to a second address map for operating the SRAM space in response based on the second indication; and operate the SRAM space using the second address map.

According to an example embodiment, an address management controller is provided. The address management controller includes: an address map controller configured to communicate with a host system; a direct address map controller; an address training controller; and an adaptive address map controller. The address map controller is configured to control the address training controller to perform an interface training for operating a static random-access memory (SRAM) based on a first indication received from the host system. The address training controller is configured to perform the interface training based on a first address map. The address map controller is further configured to control the address management controller to communicate with the host system using a second address map based on a second indication received from the host system.

These and other aspects will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made to the example embodiments herein without departing from the scope thereof, and example embodiments include all such modifications.

BRIEF DESCRIPTION OF FIGURES

The above and other aspects, features and advantages will become more apparent from the following description of example embodiments with reference with reference to the accompanying drawings, in which:

FIG. 3 is a flow chart illustrating a method for managing the address map in the NMP DIMM, according to example embodiments;

DETAILED DESCRIPTION

Figure 1:
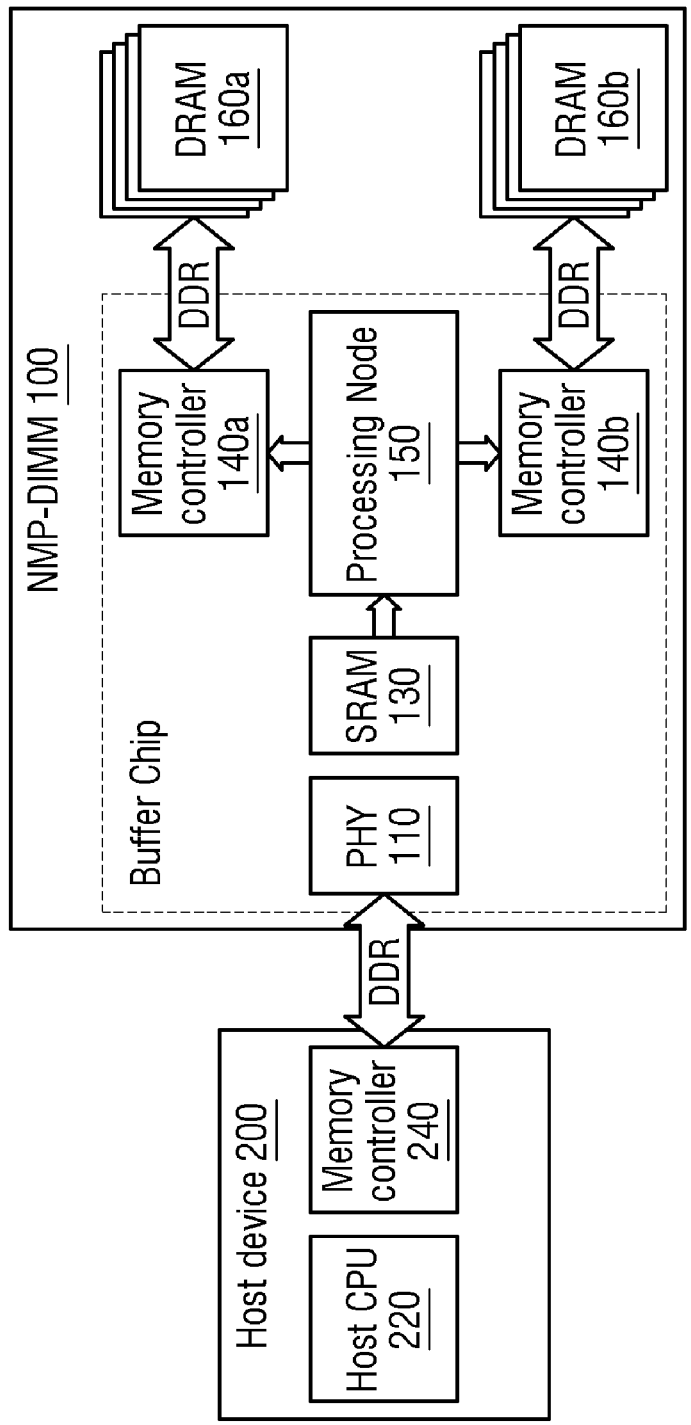
FIG. 1 illustrates a system of a host and an NMP DIMM.

Example embodiments, and various features and advantages thereof are explained more fully with reference to the accompanying drawings. Descriptions of well-known components and processing techniques are omitted so as to not unnecessarily obscure the example embodiments. Also, example embodiments described herein are not necessarily mutually exclusive, as some example embodiments can be combined with one or more other example embodiments to form new example embodiments. The term "or" as used herein, refers to a non-exclusive or, unless otherwise indicated. The examples used herein are intended to facilitate an understanding of ways in which example embodiments can be practiced and to further enable those skilled in the art to practice example embodiments. Accordingly, the examples should not be construed as limiting the scope of example embodiments.

As is traditional in the field, example embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block may be physically separated into two or more interacting and discrete blocks without departing from the scope of the disclosure. Likewise, the blocks of example embodiments may be physically combined into more complex blocks without departing from the scope of the disclosure.

The accompanying drawings provide an overview of technical features and it should be understood that example embodiments are not limited by the accompanying drawings. As such, the present disclosure should be construed to extend to any alterations, equivalents and substitutes in addition to those which are particularly set out in the accompanying drawings. Although the terms first, second, etc., may be used herein to describe various elements, these elements should not be limited by these terms. These terms are generally only used to distinguish one element from another.

Example embodiments herein provide a method for managing an address map in a Near Memory Processing (NMP) dual in-line memory module (DIMM). The method includes receiving, by the NMP DIMM, a first indication from a host system to perform interface training for operating a static random-access memory (SRAM) space and performing, by the NMP DIMM, the interface training using a first address map in response to receiving the first indication from the host system. Further, the method includes receiving, by the NMP DIMM, a second indication from the host system indicating a completion of the interface training for operating the SRAM address space and determining, by the NMP DIMM, that a second address map is to be used for operating the SRAM address space in response to receiving the second indication from the host system indicating the completion of the interface training for operating the SRAM address space. The method also includes switching, by the NMP DIMM, from the first address map to the second address map for operating the SRAM address space.

In related methods and systems, the host system assumes the SRAM to be a DRAM which includes ranks, bank groups, banks, rows and columns used for data pipelining. As a result, the host system performs the interface training and prepares the address map of the SRAM by considering the ranks, the bank groups, the banks, the rows and the columns in interleaved manner, which results in a large number of vacant spaces and non-contiguous address map at the NMP DIMM. The non-contiguous address map drastically reduces the performance speed of the NMP DIMM. Unlike to the related methods and systems, the NMP DIMM uses a first address map when the host system performs the interface training of the NMP DIMM and switches to the second address map which manages interleaving of address space. As a result, the address map at the NMP DIMM is contiguous and enhances the performance of the NMP DIMM.

FIG. 1 illustrates a system of a host system (200) and an NMP DIMM (100) used in generating an address map.

Referring to FIG. 1, a system for generating the address map of NMP DIMMs, includes the NMP DIMM (100) and the host system (200). The host system (200) may be, for example, a mobile electronic device, a smart electronic device, Personal Digital Assistant (PDA), a tablet, a wearable device, an Internet of Things (IoT) device, a virtual reality device, a foldable device, a flexible device, a display device, an immersive system or other electronic device. The host system (200) includes a host central processing unit (CPU) (220) and a memory controller (240). The host CPU (220) performs standard functions of the host system (200) after entry into operating system (OS) of the host system (200). The memory controller (240) is configured to send a power ON indication to the NMP DIMM (100) for initiating the interface training and to send an indication of completion of the interface training upon completion of the interface training.

The NMP DIMM (100) includes processing node 150 (e.g., a central processing unit (CPU)), multiple dynamic random access memory (DRAM) (160a-160b) and an SRAM (130) which is mounted on a double data rate (DDR) interface. Each DRAM (160a/160b) is controlled by a respective memory controller (140a/140b) through the DDR interface. The SRAM (130) present in the NMP DIMM (100) acts an interface between the memory controller (240) of the host system (200) and the memory controllers (140a/140b) of the NMP DIMM (100). The DRAM (160a/160b) is not directly exposed to the host system (200) and the SRAM (130) acts as an intermediate buffer to facilitate communication between the host system (200) and the DRAM (160a/160b) of the NMP DIMM (100).

The memory controller (240) of the host system (200) identifies the DRAMs (160a/160b), and the SRAM (130) as DRAMs, and trains the interface based on the identified DRAMs. The NMP DIMM (100) consists of ranks. A rank is group of DRAM chips. For example, one rank may be provided on one side of the NMP DIMM (100) and another rank may be provided on the other side of the NMP DIMM (100). Each DRAM chip (160a/160b) consists of Bank Groups which are divided into Banks. A bank consists of row and columns which are introduced for increasing the performance with pipelining and parallel access of the address space i.e., for example when data is getting transferred to or from one bank, another bank can be activated. A read or write operation in the DRAM (160a/160b) is performed by activating a first row in the bank and then issuing a read command or a write command to the first row. To access a second row in the bank, the row needs to be pre-charged.

The memory controller (240) of the host system (200) determines normal DIMMs and the NMP DIMM (100) as system memory and prepares the address map by considering interleaving at rank, bank group, bank, row and column level. However, the SRAM (130) is an acting internal memory and hence is limited in size (i.e., the size may be limited to a few KBs 16 KB, 32 KB, 512 KB, etc.) in the NMP DIMM (100). Further, the SRAM (130) does not include the rank, bank group, bank, row and column which are present in the DRAM (160a/160b), as a result when the host system (200) assumes the SRAM (130) to be the DRAM, prepares the address map a large number of vacant spaces are created in the address map of the NMP DIMM (100). As a result, the address map at the NMP DIMM (100) is non-contiguous and drastically impacts the performance of the NMP DIMM (100).

Figure 2:
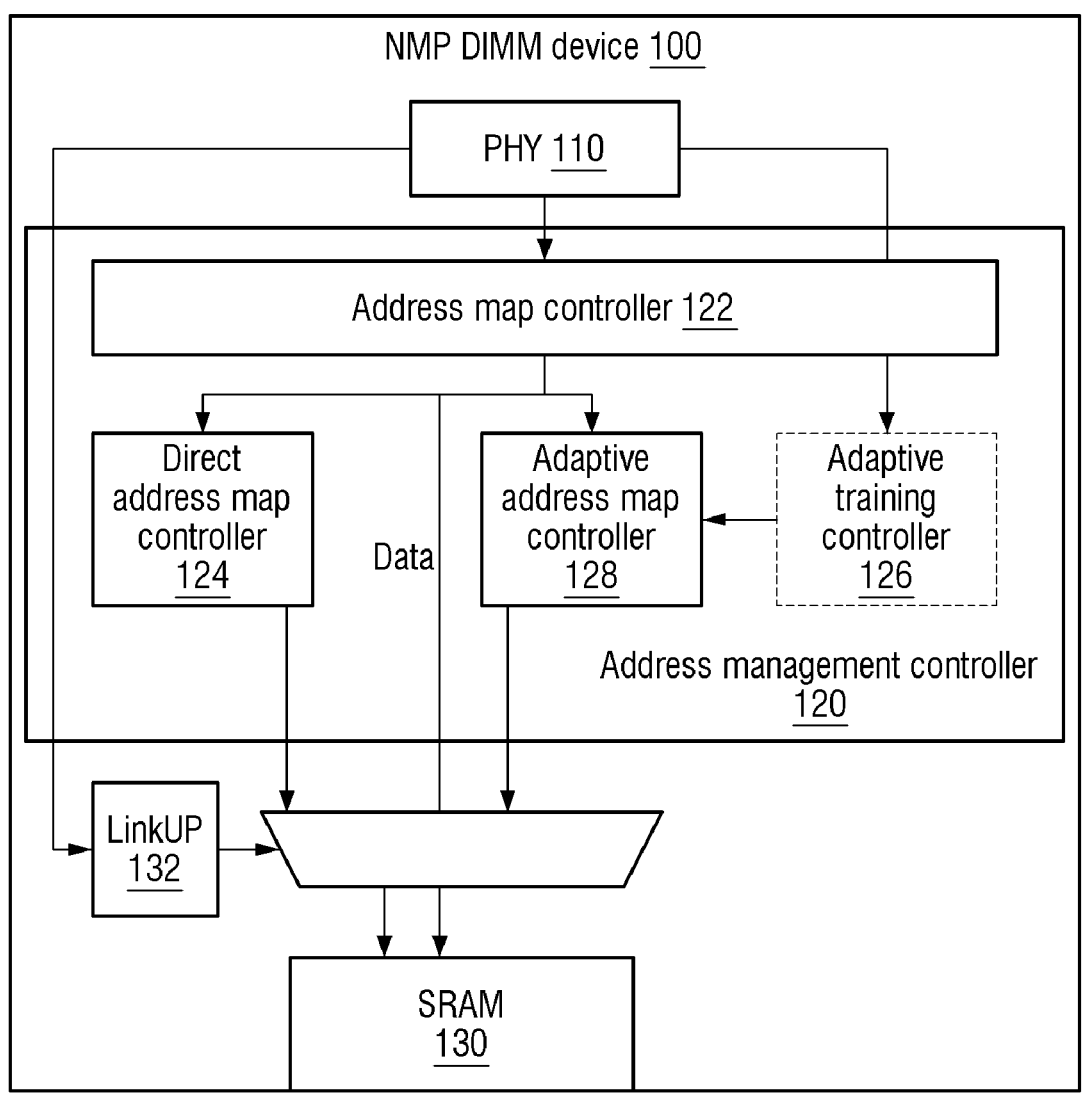
FIG. 2 illustrates hardware components of the NMP DIMM, according to example embodiments.

FIG. 2 illustrates various hardware components of the NMP DIMM (100) for managing the address map of the NMP DIMM (100), according to example embodiments.

The memory controller (240) of the host system (200) prepares the address map by interleaving addresses across the ranks, the bank groups, the banks, the rows and the columns, and the interleaving of the addresses may improve performance at the NMP DIMM (100). However, although the SRAM (130) is identified by the host device (200) as a DRAM with ranks, bank groups, banks, rows and columns, the SRAM (130) does not have the ranks, the bank groups, the banks, the rows and the columns, and any address can be accessed in any manner. Because the size of the SRAM (130) is relatively small compared to the DRAM (160a/160b) and the host system (200) maps physical address to the address of the DRAM (160a/160b) by considering the bank and the rank interleaving, the SRAM (130) address space is not seen as continuous memory space by the host system (200). As a result, the host system (200) needs to allocate a large amount of memory because of the vacant spaces in the address map. Further, the host system (200) will also create a record of valid and invalid addresses with mechanisms such as, for example, a look-up table. The creation of the record adds overhead, consumes space and impacts the performance at the NMP DIMM (100).

Referring to FIG. 2, in conjunction with FIG. 1, the NMP DIMM (100) includes a PHY (110), an address management controller (120), the SRAM (130) and a LinkUP (132).

In an example embodiment, the PHY (110) is configured to provide device level interface to physical channel of standard DIMM interface. The PHY (110) is compliant to protocol standard and takes care of required parameters for proper operations of the interface.

The address management controller (120) includes an address map controller (122), a direct address map controller (124), an address training controller (126) and an adaptive address map controller (128). The address map controller (122) is configured to receive a first indication from the host system (200) to perform the interface training for operating the SRAM (130) address space at power ON of the host system (200). Further, the address map controller (122), based on the first indication, indicates the direct address map controller (124) to initiate interface training using a first address map. The direct address map controller (124) performs the interface training using the first address map based on the first indication. The first address map is a direct address which is prepared using the address map by considering interleaving at the rank, the bank group, the bank, the row and the column level.

Further, the address map controller (122) receives a second indication from the host system (200) indicating completion of the interface training and for initiating operation of the SRAM (130) space. The address map controller (122) then indicates the address training controller (126) to switch the address map from the first address map to a second address map in post-training phase. The second indication from the host system (200) can be sent as one of mode register (MR) commands, NMP configuration register write, predefined sequence of data of address lines and a predefined data pattern to the NMP DIMM (100). The predefined data pattern may be provided by a NMP DIMM manufacturer. The predefined data pattern can be sent on address lines, data lines or both. Based on receiving the second indication from the address map controller (122), the address training controller (126) determines that the second address map needs to be used for operating the SRAM (130) space in post-training phase, and switches from the first address map to the second address map for operating the SRAM (130) space. The second address map is an adaptive address map to provide contiguous memory address at the SRAM (130) space. Therefore, during regular host system (200) accesses for operations, such as the read operation and the write operation, the second address map is used by the NMP DIMM (100), thereby eliminating the need for the look-up table identifying valid and invalid addresses, and thereby reducing the overhead for the read operation and the write operation.

According to example embodiments, there may be a dynamic number of DIMMs and NMP DIMMs. The adaptive address map controller (128) is configured to receive data traffic from the host system (200) and determine an address pattern of the data traffic received from the host system (200). Further, adaptive address map controller (128) is configured to learn a host address map pattern and accommodate the data traffic received from the host system (200) in the SRAM (130) address space based on the learning. The data traffic is interleaved at the rank, the bank group, the row and the column.

According to example embodiments, there may be a fixed number of NMP DIMMs. In this case, the adaptive address map controller (128) can be excluded from the address management controller (120) as the host address map pattern will be fixed and a learning of the host address map pattern may not be required.

According to example embodiments, the address management controller (120) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an example embodiment, the LinkUP (132) is a status bit within the NMP DIMM (100) which is set on completion of the training stage indicated by the second indication method. Further, the LinkUP (132) can be set through the MR register or a NMP configuration register write or by sending a predefined pattern.

Although FIG. 2 shows hardware elements of the NMP DIMM (100), it is to be understood that example embodiments are not limited thereon. In other example embodiments, the NMP DIMM (100) may include additional or fewer elements. Further, the labels or names of the elements are used only for illustrative purpose and do not limit the scope of the disclosure. One or more components can be combined together to perform same or substantially similar function.

FIG. 3 is a flow chart 300 illustrating a method for managing the address map in the NMP DIMM (100), according to example embodiments.

Referring to FIG. 3, at operation 302, the NMP DIMM (100) receives the first indication from the host system (200) to perform the interface training for operating the SRAM (130) address space. For example, in the NMP DIMM (100) illustrated in FIG. 2, the address management controller (120) is configured to receives the first indication from the host system (200) to perform the interface training for operating the SRAM (130) address space.

At operation 304, the NMP DIMM (100) performs the interface training using the first address map in response to receiving the first indication from the host system (200). For example, in the NMP DIMM (100) illustrated in FIG. 2, the address management controller (120) is configured to perform the interface training using the first address map in response to receiving the first indication from the host system (200).

At operation 306, the NMP DIMM (100) receives the second indication from the host system (200) indicating the completion of the interface training for operating the SRAM (130) address space. For example, in the NMP DIMM (100) illustrated in FIG. 2, the address management controller (120) is configured to receive the second indication from the host system (200) indicating the completion of the interface training for operating the SRAM (130) address space.

At operation 308, the NMP DIMM (100) determines that the second address map is to be used for operating the SRAM (130) address space in response to receiving the second indication from the host system (200) indicating the completion of the interface training for operating the SRAM (130) address space. For example, in the NMP DIMM (100) illustrated in FIG. 2, the address management controller (120) is configured to determine that the second address map is to be used for operating the SRAM (130) address space in response to receiving the second indication from the host system (200) indicating the completion of the interface training for operating the SRAM (130) address space.

At operation 310, the NMP DIMM (100) switches from the first address map to the second address map for operating the SRAM (130) address space. For example, in the NMP DIMM (100) illustrated in FIG. 2, the address management controller (120) is configured to switch from the first address map to the second address map for operating the SRAM (130) address space.

The various actions, acts, blocks, operations, or the like in the method may be performed in the order presented, in a different order or simultaneously. Further, in some example embodiments, some of the actions, acts, blocks, operations, or the like may be omitted, added, modified, skipped, or the like without departing from the scope of the disclosure.

Figure 4A:
FIG. 4A illustrates example address maps created at the host system for operating an SRAM address space.

FIG. 4A illustrates example address maps created at the host system (200) for operating the SRAM (130) address space.

In general, a size of the SRAM (130) is small compared to DRAM (160) and the host system (200) maps the physical address to the address of the DRAM (160) by considering the bank and the rank interleaving. Therefore, the SRAM (130) address space is not seen as continuous memory space by the host system (200). As a result, the host system (200) is required to allocate two, four, eight, etc., times more memory because of the address map to accommodate the non-continuous memory space. Further, the host system (200) will keep note of valid and invalid addresses with mechanism such as lookup table etc., which will add overhead, consume space and impact the performance of the NMP DIMM (100).

Referring to FIG. 4A, a 512 KB SRAM (130), which is treated as a DRAM by the host device (200), is divided virtually in to the bank groups, banks, the rows and the columns so as to abide by rules of the memory controller (140a/140b). Example address maps are provided which may vary based on the memory controller (140a/140b). Block 1 of FIG. 4A illustrates an example address map used during the interface training of the NMP DIMM (100) for establishing the interface between the DRAM (160) and the memory controller (140a/140b) in contiguous sequence. After training, the address map is prepared by BIOS based on the DIMMs, the channels, sockets etc. To accommodate 512 kb of data from the host system (200) the host physical addresses from 0-18 are sufficient. The same can be accommodated at 10 columns, 4 rows and 4 bank groups and banks. However, due to multiple DIMMS available when the host system (200) is preparing the address map for the NMP DIMM (100) a row bit i.e., row R2 will come in-between the address map. The SRAM (130) has only row R0 and row R1 and there is no row R2 in the SRAM (130). As a result, after every 215 addresses, there is a hole which is created (such as the row R2) leading to discontinuity in the address map. Further, when the host system (200) sends the data traffic to be accommodated at the NMP DIMM (100) based on the address map created and hence the data directed to the row R2 may be accommodated elsewhere leading to confusion and performance degradation.

Block 2 of FIG. 4A illustrates an example address map in which the host system (200) identifies the SRAM (130) as a DRAM and allocates 1 MB to the SRAM (130) because of the row R2 bit and maintains a look-up table identifying valid and invalid addresses. However, the SRAM (130) has only the row R0 and the row R1, and there is no row R2.

Block 3 of FIG. 4A illustrates another example address map in which the host system (200) allocates 2 MB because of the row R2 bit and chip set bit CS0, and maintains a look-up table identifying valid and invalid addresses.

Block 4 of FIG. 4A illustrates yet another example address map in which the host system (200) allocates 4 MB because of the row R2 bit, the chip set bit CS0 and channel bit CH0, and maintains a look-up table identifying valid and invalid addresses.

Therefore, as shown in the above examples, the host system (200) address allocation size and the look-up table size increase based on changes in the address map. Generally, a server system will have multiple CPUs, multiple channels, multiple DIMMs, multiple ranks, etc., which will drastically degrade the performance of the server system.

Figure 4B:
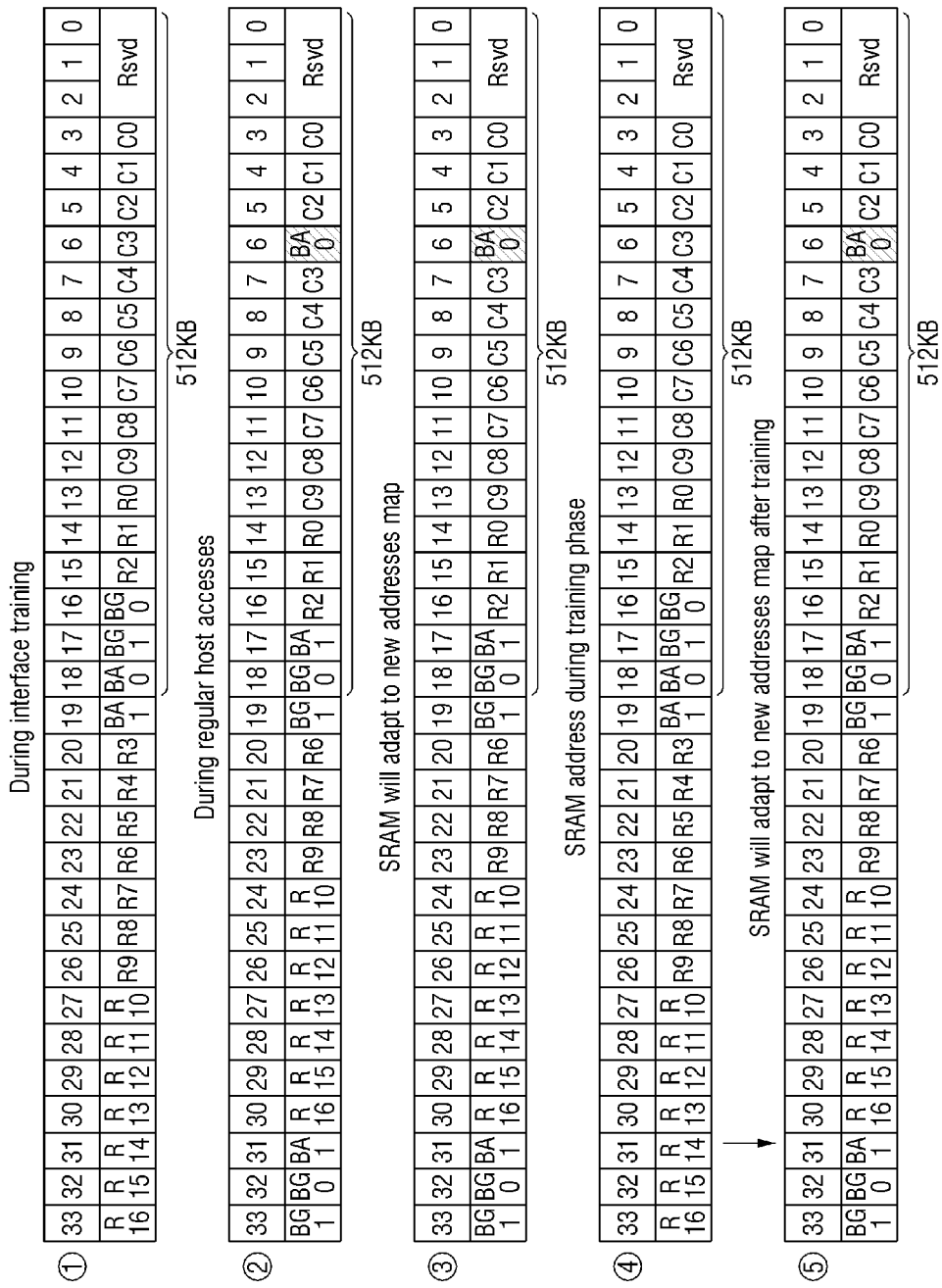
FIG. 4B is an example illustrating the address map created at the host system for operating the SRAM address space, according to example embodiments.

FIG. 4B illustrates example address maps created at the host system (200) for operating the SRAM (130) address space, according to example embodiments.

Referring to FIG. 4B, the address mapping of the NMP DIMM (100) uses the first address map for interface training phase of the SRAM (130) address space. Once the host system (200) indicates to the NMP DIMM (100) that the interface training is complete, the NMP DIMM (100) switches to the second address map for operating the SRAM (130) address space such as write and read operations. The host system (200) indicates to the NMP DIMM (100) that the interface training is complete by sending a unique pattern or setting a mode register bit. In another example, a bit is used for indicating to the NMP DIMM (100) that the host system (200) has completed the interface training.

Examples of bank interleaving with address mapping used by the memory controller (240) at different stages provided are shown in FIG. 4B. Block 1 illustrates an example first address map used during the interface training by the host system (200). During the interface training phase the host system (200) prepares the first address map assuming the SRAM (130) to be a DRAM. At block 2, the second address map is used during regular accesses by the host system (200) such as the read and the write operations to the SRAM (130). At blocks 3-5, the SRAM (130) adapts to the second addresses map based on receiving the indication from the host system (200) that the interface training is completed.

Figure 5A:
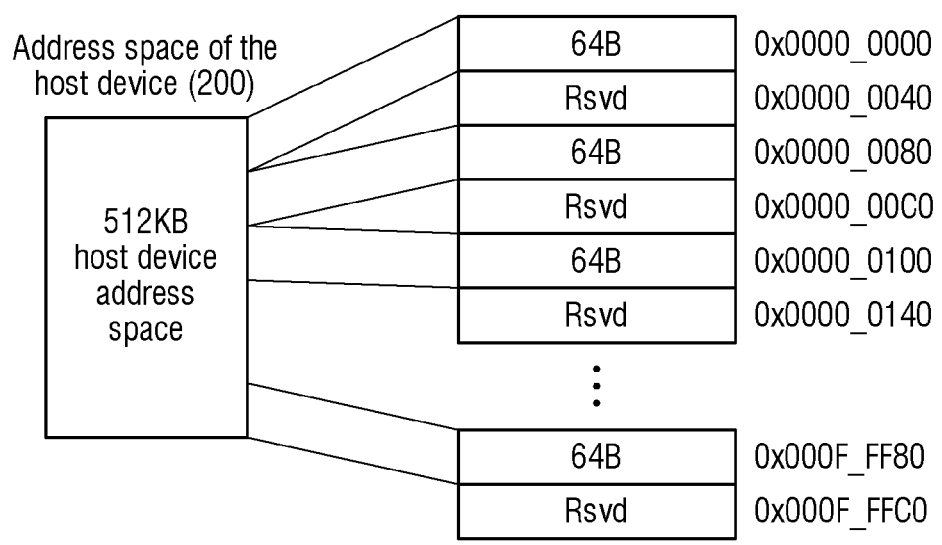
FIG. 5A is an example illustrating a scenario of interleaved SRAM address space.

FIG. 5A is an example illustrating a scenario of interleaved SRAM (130) address space.

Referring to FIG. 5A, consider an address space of the host system (200) having a capacity of 512 KB with the host address map. The first 64B (i.e., address location 0x0000_0000 in the address map) is pointing to a first address in the SRAM (130) but the next 64B (i.e., Rsvd at address location 0x0000_0040) may be pointing to a tenth address and not to a second address in the SRAM (130). However, at the NMP DIMM (100) side, the address map is not synchronized with the host address map, thereby leading to the data traffic being allocated without any logic. For example, the address map at the NMP DIMM (100) does not know that the first 64B of data of the 512 KB of data from the host system (200) should be read from the first address of the SRAM (130) and the next 64B of data should be read from the tenth address of the SRAM (130).

Therefore, when the host system (200) has to allocate 1 MB or 2 MB instead of the 512 KB due to the vacant spaces in the address map due to the discontinuity in the address map. As a result, size of the host address map will also be larger. Further, if the number of most significant bits (MSB) within the address space of the SRAM (130) is greater than the capacity, then additional space needed will be multiplied accordingly. Further, the problem of rank interleaving SRAM (130) also exists which contributes to degradation of the performance of the NMP DIMM (100).

Figure 5B:
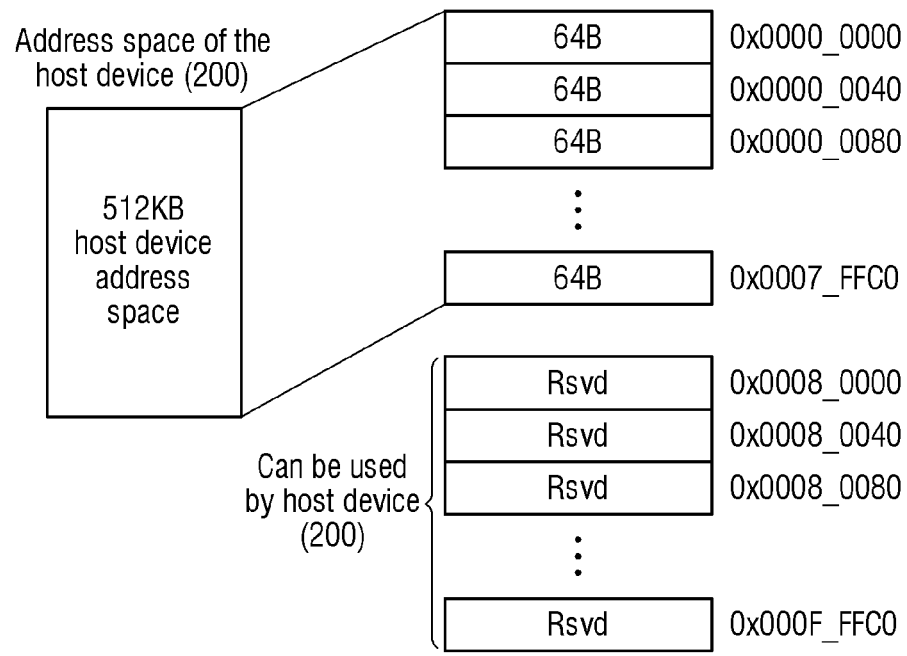
FIG. 5B is an example illustrating a scenario of contiguous SRAM address space, according to example embodiments.

FIG. 5B is an example illustrating a scenario of contiguous SRAM (130) address space, according to example embodiments.

Referring to FIG. 5B, in conjunction with FIG. 5A, in the method according to example embodiments, during the interface training of the NMP DIMM (100), the first address map is used by the NMP DIMM (100). As the host system (200) sends the indication to the NMP DIMM (100) that the interface training is completed, the NMP DIMM (100) switches to the second address map for normal mode of operation of the SRAM (130) space. As a result, due to the switching of the address map from the first address map to the second address map, the entire 512 KB of the SRAM (130) address space is contiguous (i.e., from 0x0000_0000 to 0x0007 FFC0) which enhances performance of the NMP DIMM (100). Further, the SRAM (130) address space which is vacant (0x0008_0000 and 0x000F_FFC0) is both available and segregated, and can be used by the host system (200).

Performance over head is created in the interleaved SRAM (130) address space because of the lookup operation for every read and write operation. However, the performance over head is reduced drastically in the contiguous SRAM (130) address space due to the switch from the first address map to the second address map. Further, a space over head for 512 KB with twice the memory allocation (1 MB) is 8 KB for maintaining validity for each 64 byte address which is also reduced drastically in the contiguous SRAM (130) address space.

Figure 6A:
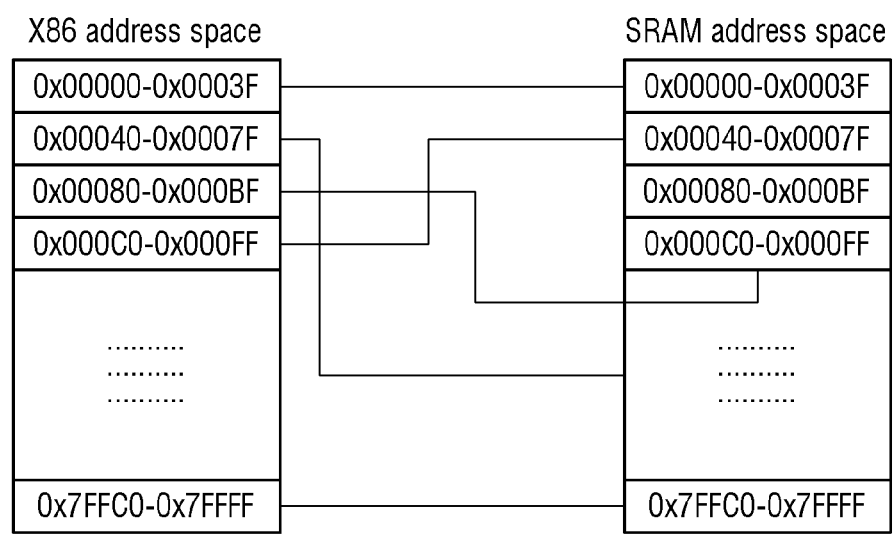
FIG. 6A is an example illustrating a split in SRAM due to address map.

FIG. 6A is an example illustrating a split in SRAM (130) due to an address map.

FIG. 6A illustrates a 32-bit address space of a X86 architecture and the SRAM (130) which is an acting internal memory and is limited in the NMP DIMM (100). In related methods, the address map is interleaved and not contiguous, thereby leading to vacant spaces in memory address map. As a result of the non-contiguous address map, the data traffic received from the host system (200) is spread across the SRAM (130) which degrades the performance of the NMP DIMM (100).

Figure 6B:
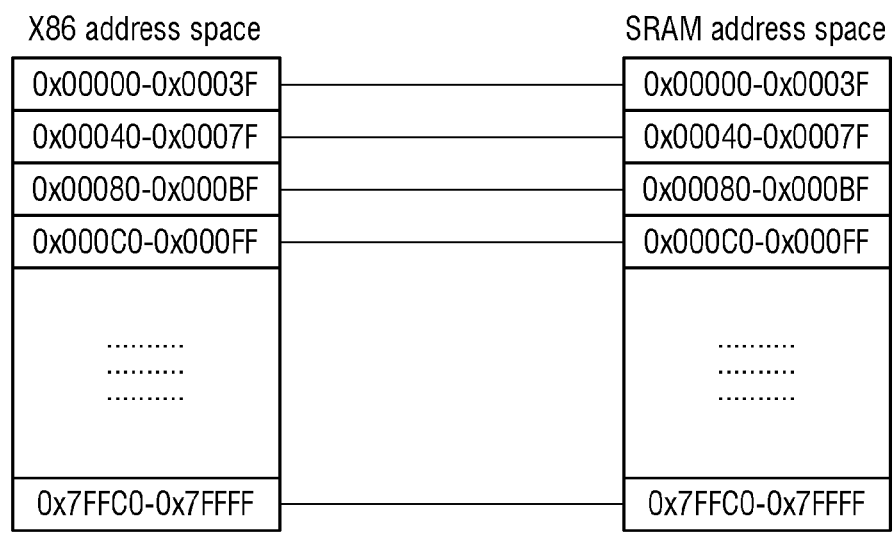
FIG. 6B is an example illustrating continuity in the SRAM due to address map, according to example embodiments.

FIG. 6B is an example illustrating a continuity in the SRAM (130) due to address map, according to example embodiments.

Referring to FIG. 6B in conjunction with FIG. 6A, in the method according to example embodiments, the NMP DIMM (100) uses the first address map for performing the interface training and upon completion of the interface training switches to the second address map for the normal operation of the NMP DIMM (100). As a result of the contiguous address map, the data traffic received from the host system (200) is also contiguous thereby enhancing the performance of the NMP DIMM (100).

While example embodiments have been shown and described above, it will be apparent to those skilled in the art that modifications and variations could be made without departing from the scope of the present inventive concept as defined by the appended claims.

What is claimed is:

1. A method for managing an address map in a Near Memory Processing (NMP) dual in-line memory module (DIMM), the method comprising:
   receiving, by the NMP DIMM, a first indication from a host system to perform interface training for operating a static random-access memory (SRAM) space;
   performing, by the NMP DIMM, the interface training using a first address map based on the first indication;

receiving, by the NMP DIMM, a second indication from the host system indicating completion of the interface training for operating the SRAM space;

switching, by the NMP DIMM, from the first address map to a second address map for operating the SRAM space based on the second indication; and operating, by the NMP DIMM, the SRAM space using the second address map.

2. The method as claimed in claim 1, further comprising:

receiving, by the NMP DIMM, data traffic from the host system, wherein the data traffic is interleaved at, any one or any combination of a rank, a bank group, a row and a column;

identifying, by the NMP DIMM, an address pattern of the data traffic received from the host system;

learning, by the NMP DIMM, a host address map corresponding to the host system; and accommodating, by the NMP DIMM, the data traffic received from the host system in the SRAM space based on the host address map.

3. The method as claimed in claim 1, wherein the first address map is a direct address map and the second address map is an adaptive address map.

4. The method as claimed in claim 1, wherein the second indication from the host system is provided by one of Mode Register (MR) commands, a NMP configuration register write, a predefined sequence of data of address lines, and a predefined data pattern to the NMP DIMM.

5. The method as claimed in claim 1, wherein the first indication from the host system is received at power ON of the host system.

6. A Near Memory Processing (NMP) dual in-line memory module (DIMM) for managing an address map, the NMP DIMM comprising:

a static random-access memory (SRAM) provided on a Double Data Rate (DDR) interface; and an address management controller coupled to the SRAM, and configured to control the NMP DIMM to:

receive a first indication from a host system to perform interface training for operating an SRAM space;

perform the interface training using a first address map based on the first indication;

receive a second indication from the host system indicating completion of the interface training for operating the SRAM space;

switch from the first address map to a second address map for operating the SRAM space in response based on the second indication; and operate the SRAM space using the second address map.

7. The NMP DIMM as claimed in claim 6, wherein the address management controller is further configured to control the NMP DIMM to:

receive data traffic from the host system, wherein the data traffic is interleaved at, any one or any combination of a rank, a bank group, a row and a column;

identify an address pattern of the data traffic received from the host system;

learn a host address map corresponding to the host system; and accommodate the data traffic received from the host system in the SRAM space based on the host address map.

8. The NMP DIMM as claimed in claim 6, wherein the first address map is a direct address map and the second address map is an adaptive address map.

9. The NMP DIMM as claimed in claim 6, wherein the second indication from the host system is provided by one of MR commands, a predefined sequence of data of address lines, NMP configuration register write and a predefined data pattern to the NMP DIMM.

10. The NMP DIMM as claimed in claim 6, wherein the first indication from the host system is received at power ON of the host system.

11. The NMP DIMM as claimed in claim 6, wherein addresses of the second address map are contiguous.

12. The NMP DIMM as claimed in claim 6, wherein the second address map are contiguous.

13. The NMP DIMM as claimed in claim 6, further comprising:

a first dynamic random access memory (DRAM);

a second DRAM;

a first memory controller configured to control the first DRAM; and a second memory controller configured to control the first DRAM.

14. An address management controller comprising:

an address map controller configured to communicate with a host system;

a direct address map controller;

an address training controller; and an adaptive address map controller, wherein the address map controller is configured to control the address training controller to perform an interface training for operating a static random-access memory (SRAM) based on a first indication received from the host system, wherein the address training controller is configured to perform the interface training based on a first address map, and wherein the address map controller is further configured to control the address management controller to communicate with the host system using a second address map based on a second indication received from the host system.

15. The address management controller as claimed in claim 14, wherein the address map controller is further configured to:

receive interleaved data traffic from the host system;

identify an address pattern of the data traffic received from the host system;

learn a host address map corresponding to the host system; and accommodate the data traffic received from the host system in the SRAM based on the host address map.

16. The address management controller as claimed in claim 15, wherein the data traffic is interleaved at, any one or any combination of a rank, a bank group, a row and a column.

17. The address management controller as claimed in claim 14, wherein the first address map is a direct address map and the second address map is an adaptive address map.

18. The address management controller as claimed in claim 14, wherein the second indication from the host system is provided by one of MR commands, a predefined sequence of data of address lines, a Near Memory Processing (NMP) configuration register write and a predefined data pattern to a NMP dual in-line memory module (DIMM).

19. The address management controller as claimed in claim 18, wherein the address management controller is further configured to set a status bit based on the second indication.

20. The address management controller as claimed in claim 14, wherein the first indication from the host system is received at power ON of the host system.

\* \* \* \* \*